United States Patent [19]

Huybrechts

[11] Patent Number: 4,888,383
[45] Date of Patent: Dec. 19, 1989

[54] METHOD FOR AQUEOUS DISPERSION OF POLYURETHANE MODIFIED POLYACRYLICS

[75] Inventor: Jozef T. Huybrechts, Oud-Turnhout, Belgium

[73] Assignee: E. I. Du Pont De Nemours and Company, Wilmington, Del.

[21] Appl. No.: 228,003

[22] Filed: Aug. 3, 1988

[51] Int. Cl.$^4$ .............................................. C08J 3/02
[52] U.S. Cl. .................................. 524/832; 524/457; 524/819
[58] Field of Search ............... 524/819, 457, 832, 833; 525/127, 131; 528/59, 75

[56] References Cited

U.S. PATENT DOCUMENTS 3,624,020  11/1971  Klebert .................................. 528/75

Primary Examiner—Joseph L. Schofer
Assistant Examiner—Jeffrey T. Smith
Attorney, Agent, or Firm—Richard H. Burgess

[57] ABSTRACT

A method for preparing a stable aqueous dispersion of polyurethane modified polyacrylic involving chain extension of polyacrylic with isocyanate and hydroxyl- or amino-functional groups.

17 Claims, No Drawings

METHOD FOR AQUEOUS DISPERSION OF POLYURETHANE MODIFIED POLYACRYLICS

BACKGROUND OF THE INVENTION

This invention concerns stable aqueous dispersions of polyurethane-urea modified polyacrylics. Polyether or polyester urethane-urea emulsions are high Mw, thermoplastic type polymer dispersions which give outstanding mechanical properties in various applications. The balance of properties is believed to come from the block structure with rigid urea-urethane semi-crystalline phase in a flexible polyether or polyester matrix. Problems with these disperisons are poor rheology and thermoplastic behavior.

Polyether urethane polymers have less than optimum durability, especially in outdoor exposure, and polyester urethanes lack good hydrolysis resistance.

Polyurethanes based on aliphatic or cycloaliphatic di- or polyisocyanates are also high priced while those based on aromatic diisocyanates completely lack good outdoor durability due to yellowing on exposure. The typical thermoplastic behavior and poorer rheology is inherent to the technology of making high Mw polyurethane-urea dispersions since the many techniques (see a review article by Dieterich in Progress in Organic Coatings 9(1981 281-340) available for making such aqueous dispersions do not permit easy handling and control of functionality (acid, hydroxyl, amide, etc.) within the polymer architecture needed to give it thermoset behavior and built-in rheology. Acrylic dispersions or emulsions on the other hand prepared via free radical initiated reactions do easily allow the formulator to build in reactive groups to give the polymer the necessary rheological and thermoset behavior. It would therefore be preferable to combine the good rheological and thermoset properties of reactive acrylics with the outstanding mechanical properties of polyurethanes.

Both types of polymers, however, are in many cases incompatible due to large solubility parameter differences. Incompatibility does show up in many examples as a phase separation or complete kick-out of the mixed blend polyurethane-urea with acrylic or as a loss in film integrity and physical properties, when applied afterwards. The present invention provides for a method of making a polyurethane-urea modified polyacrylics in which the acrylic has functional groups such as hydroxyl, acid, amine and amide by chain extension of an acrylic dispersion or emulsion having primary or secondary amine groups to form a polyurethane-urea polyacrylic dispersion.

DESCRIPTION OF THE PRIOR ART

The production of linear or cross-linked aqueous polyurethane-urea dispersions is known as shown in several patents including U.S. Pat. Nos. 3,479,310; 3,870,684; 4,066,591; 4,092,286; 4,203,883; 4,237,264; 4,238,378; 4,408,008, and 4,701,480. The aqueous polyurethane-urea dispersions may be used in a wide range of commercial applications such as adhesives and coatings.

The production of functional acrylic dispersions or emulsions has been described in many patent applications as U.S. Pat. Nos. 4,558,092; 4,403,003; 4,322,328; 4,609,690; 4,522,973; 4,733,786; 4,442,257; 4,525,510, and European patent EP 007107.

Acrylic emulsions or dispersions are also used in many commercial applications as adhesives and coatings. Polyurethane-urea modified acrylics are described in some patent applications, however, prior art does not allow to produce the dispersions as actually claimed in our invention.

U.S. Pat. No. 4,318,833 to M. Guagliarde and EP No. 189,945 to Witco, do not permit having acid, amine or hydroxyl functional monomers in the acrylic since this would react with or terminate the NCO prepolymer. Witco describes formation of the polyurethane isocyanate terminated prepolymer in a monomer blend which obviously should be unreactive versus isocyanate dispersing into water, chain extending and polymerizing the monomer blend.

U.S. Pat. No. 4,153,778, Union Carbide, does not mention polyacrylics. They cap isocyanate terminated prepolymer with hydroxyl functional monomer before dispersing in water. Canadian Pat. No. 1,201,244 describes polymer polyurethane acrylate polymer dispersions however different from the present invention, since the acrylic capped polyurethane-urea is dispersed in an inert polymerizable monomer. The end use is in molded articles. Japan Kokai 79/77,795 to Dainippon teaches polymerizing a blend of acrylic monomers in water in the presence of an aqueous urethane dispersion. Japan Kokai 59/157,101-3, Toho, concerns modifications of the above using GMA and HEMA.

Ashland Oil U.S. Pat. No. 4,609,690 describes a blend of an hydroxyl functional latex with a dispersible multifunctional isocyanate based crosslinker for structural adhesives in laminates.

"Aqueous Dispersions of Crosslinked Polyurethanes" by Terpak and Markusch in Journal of Water Borne Coatings — Nov. 1, 1986, pages 13–21, teaches the use of polyfunctional amine for crosslinking with dispersed isocyanate prepolymer modified with ethylene oxide and ionic hydrophilic groups.

SUMMARY OF THE INVENTION

The invention provides a method of preparing a stable aqueous dispersion of polyurethane modified polyacrylic comprising preparing a reaction mixture in the form of an aqueous dispersion or emulsion of amine-functional or amine- and hydroxyl-functional polyacrylic, adding to the reaction mixture prepolymer chain of polyisocyanate or isocyanate-terminated polyurethane, and reacting the resultant mixture to cause chain extension of the ingredients.

DETAILED DESCRIPTION OF THE INVENTION

A. Acrylic Dispersions

Typical acrylic dispersions can be produced in water dilutable solvents or other solvents which are not water soluble. In the latter case, the solvents can be stripped-off after inverting into water. The following exemplary lists are not limiting.

Examples of water dilutable solvents:

alcohols such as methanol, ethanol, isopropanol, ethylene glycol, butanol and 2-ethylhexanol, glycolethers such as ethylene glycolmonoethylether, diethyleneglycol monobutylether and propylene glycol methyether, ketones such as acetone and methylethylketone, solvents such as N-methylpyrolidone, dimethylformamide and tetrahydrofuran. Examples of solvents partially or non-miscible with water:

aromatic such as toluene, xylene, Solvesso 100 from Esso;

aliphatics such as heptane and mineral spirits, glycolether acetates such as methylether of propylene glycolacetate.

The composition of the acrylic is based on typical unsaturated compounds, and in order to be anionically dispersible the acid value should be at least 25. Preferred is an acid value between 30 and 150 and more preferred between 40 and 100. Typical acid functional monomers are organic types—acrylic acid, methacrylic acid, maleic acid, fumaric acid and itaconic acid, inorganic types—2 acrylamido-2-methylpropanesulfonic acid (AMPS), 2-methacryloxyethyl phosphate (MOP), described in PCT patent publications W088/02381, Apr. 7, 1988 and W088/02382 of the same date, and 2-sulfoethyl methacrylate.

Other functional or non-functional monomers can be copolymerized as:

| esters | methyl-, ethyl-, butyl-, isobutyl-, lauryl-, 2-ethylhexylacrylate and/or methacrylate |
|---|---|
| hydroxy | hydroxyethyl acrylate and/or methacrylate, hydroxypropyl acrylate and/or methacrylate |
| aromatic | styrene, vinyltoluene |
| amide | acrylamide, methacrylamide, N—methylolacrylamide, butoxy methylacrylamide or methacrylamide, methoxy methylacrylamide and/or methacrylamide |
| silane | methacryloxyethyltriethoxysilane |
| nitrile | acrylonitrile, methacrylonitrile |
| chloride, acetate | vinylacetate, vinylchloride, reaction product of monofunctional epoxies such as, Shell's Cardura E, phenylglycidyl ether with acrylic acid, methacrylic acid. |

The acrylic copolymer can also be acid functionalized via anhydride capping of hydroxy groups or via anhydride copolymerization, e.g., maleic anhydride, itaconic anhydride, capping of hydroxy functional copolymer with succinic anhydride, phthalic anhydride, trimellitic anhydride.

The polymer is formed via radical initiated copolymerization using eventually chain transfer agents.

Initiators

Azo: AIBN azobisisobutylronitrile and the like peroxide: t-butylperoxide, t-butylperacetate, etc.

Chain Transfer Agents 2-mercaptoethanol, t-dodecylmercaptan, laurylmercaptan, or chlorinated solvents.

The acid functional prepolymer can be amine converted by reaction with an imine such as propylene imine, ethyleneimine or hydroxyethylethyleneimine.

A certain part of the acid groups are neutralized with tertiary amine so as to make the polymer water dispersible: triethylamine, dimethylethanolamine, etc.

The amount of neutralization can be between 20–200% of the free acid groups left after imination reaction, preferably between 70 and 130%.

The molecular weight can be between 1500 and 50,000 number average molecular weight, preferably between 3000 and 20,000. The glass transition temperature can be between $-80°$ C. and $+130°$ C.

The total composition of the copolymer can vary, preferably it is based on 3-30% of an acid functional monomer, 0.2-15% of amine functional monomer obtained through imination of part of the acid groups after the polymer is formed, 0-40% of hydroxy, silane, alkoxymethylamide, nitrile, amide or other functional monomers. Balance: aromatic, acrylic or methacrylic, vinyl non-functional monomers.

The acrylic copolymers can be produced by thermally initiated radical polymerization in the temperature range between 40° and 200° C., preferably between 60° and 180° C., specifically between 60° and 120° C. in case there are more than one different functional groups present that can react with each other that might gel the polymer. When this is not the case, polymerization temperatures can be up to 180° C. The amounts of initiators and chain transfer agents present can be between 0.05 and 10% on monomer weight, preferably between 0.2 and 4%.

B. Acrylic Emulsions

Typical acrylic emulsions can be produced in water which contains a surfactant and optionally some solvent present. Examples of surfactants can be anionic, nonionic or cationic or blends.

Typical examples of nonionics are alkyl phenolethoxylates and alkyl ethoxylates represented by the following chemical structures:

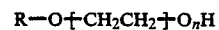

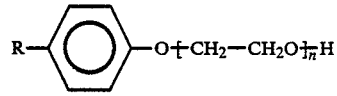

with R for instance octyl, isononyl or nonyl.

Typical examples of anionic surfactants are salts of alkylsulfates, alkylsulfonates, alkyl phosphates, and sulfated alkylphenolethoxylates.

Typical examples of cationic surfactants are alkyltrimethylammonium chloride, and laurylpyridinium chloride.

The amount of surfactant used can vary between 0.01 and 20% calculated on monomer but is preferably between 0.2 and 5%. Emulsion polymerization typically uses water soluble initiators such as persulfates but it is not limited to them. One could also use partial soluble or water insoluble initiators as the one mentioned under dispersion polymers.

The composition of the copolymer can vary as mentioned under dispersion polymers.

Acid functional monomers need not be present, but they can be present. The presence of acid groups in an emulsion polymer can also vary and can have various purposes such as to provide a reaction site for an imine to make the amine group on the polymer, additionally stabilizing the latex, building in rheology or pigment wetting.

The amine group however can also be formed through reaction of an epoxy functional unsaturated monomer with ammonia, mono, di, or polyamines which are primary, secondary and/or blends.

Examples of an epoxy functional unsaturated monomers are: glycidylacrylate, glycidylmethacrylate.

Examples of mono amines are aliphatic, cycloaliphatic, aromatic such as ethanol amine, alkylamines (methyl, ethyl, propyl, butyl or lauryl), cyclohexylamine, benzylamine and aromatic amines such as aminobenzene.

Examples of diamines are aliphatic, cycloaliphatic, aromatic such as ethylenediamine, hexamethylenediamine, isophoronediamine, xylylenediamine or diaminobenzene.

Examples of polyether amines are polyethyleneoxidediamines or polypropyleneoxide diamines as known under the tradename Jeffamine from Texaco.

Examples of polyamines can be aliphatic, cycloaliphatic or aromatic, diethylene triamine or triethylenetetramine.

The amount of ammonia, mono-, di- or polyamines is calculated based on the amount of glycidyl group but can vary and is only limited to the final stability of the amine functional emulsion.

If one uses di- or polyamines the emulsion formed can be microgelled.

Other bi- or polyfunctional monomers can be used in the emulsion prepolymers to form microgels, e.g., allylmethacrylate, diethyleneglycol dimethacrylate, butanedioldiacrylate, trimethylolpropanetriacrylate, etc.

The amounts used of such bi- or polyfunctional monomers can vary and the only limiting factor is the final stability of the emulsion.

A typical composition of an emulsion would be 0.2–10% of a primary or secondary amine functional monomers that can be obtained (1) through reaction of an acid functional group with an imine and (2) through reaction of ammonia, a mono-, di- or polyamine with an epoxy functional group, in both cases after polymer has been formed;

0.30% Of an acid functional unsaturated monomer.

0–40% Of a hydroxy, alkoxymethylamide, nitrile, amide, silane or other functional monomers. 0–10% Of poly-unsaturated monomers. Balance aromatic, acrylic or methacrylic vinyl or other non-functional monomers.

The emulsion polymer is typically produced between room temperature and 100° C. In case of lower temperature (20°–60° C.) reducing agents as sodium bisulfite can be used to accelerate decomposition of the initiator. The pH of the final emulsion can be adjusted accordingly using amines for anionic emulsions or acids for cationic emulsions. Another way of crosslinking or "chain extending" the emulsion is the use of hydrazides which are known to react with ketones or aldehydes. Examples of such functional unsaturated monomers are acrylein, diacetone acrylamide. The "hydrazide" funtional emulsion can be further reacted with aldehydes as, e.g., formaldehyde. To further modify the emulsion other additives can be added as fungicides, preservative, external crosslinkers, etc.

C. Polyurethane Dispersions and Emulsions

Isocyanate terminated prepolymers to modify the amine functional dispersions or emulsion.

Many patents describe methods of making chain extended polyurethane dispersions using built-in ionic salt groups to stabilize the dispersion or external surfactants. An article by Dieterich in Progress in Organic Coatings 9(1981) 281–340 reviews the various technologies that can be used to make the polyurethane prepolymer before dispersing and chain extending in water. Numerous patents exist in this field.

Chain extending the amine or hydrazide functional acrylic dispersion or emulsion can be done by using aliphatic, cycloaliphatic or aromatic polyfunctional isocyanates, preferably bifunctional aliphatic or cycloaliphatic diisocyanates.

Examples of such diisocyanates are hexamethylene diisocyanate, trimethylhexamethylene diisocyanate, bis (4-isocyanatocyclohexyl)-methane such as Desmodur W from Bayer, xylylene diisocyanate, tetramethyl xylene diisocyanate.

Examples of aromatic and polyfunctional isocyanates are: toluene diisocyanate, diphenylmethane diisocyanate, Bayer's Desmodur N (trifunctional biuret of hexamethylene diisocyanate), or Desmodur N3390 (cyclotrimer of hexamethylene diisocyanate).

Chain extension can also be done by a polyester, polyether-urethane which has an isocyanate as terminal groups.

The polyester can be linear or branched and is typically based on aliphatic, aromatic, mono-, di- or polyacids and mono-, di- or polyfunctional alcohols.

Preferably the isocyanate terminated prepolymer is linear and based on difunctional reactants with the diisocyanate in excess. Bifunctional polyesters which are hydroxy terminated are made by reacting dialcohols with diacids, stripping off water in the temperature range of 150°–250° C., then using esterification catalysts such as tin salts or strong acids, e.g., dibutyltindioxide or p-toluene-sulfonic acid can be used. Polyesters are characterized by the OH value and/or the number average molecular weight which can vary between OH value 10–300 with MW of 150–11000. Typical examples of diacids or anhydrides are phthalic anhydride, isophthalic acid, terephthalic acid, adipic acid, succinic acid, maleic anhydride fand fumaric acid. Typical examples of dialcohols are propane diol -1,2 or -1,3 ethylene glycol, dimethyl 2,2-propanediol, butanediol (1,2 or 1,3 or 1,4), hexanediol (1,2 or 1,6), dimethylol 1,4 cyclohexane, etc. The polyurethane prepolymer can contain water soluble or ionic groups which will after dispersion in water additionally stabilize the polyolefin polyurethane dispersions.

An example of a cationic group is diethanolmonomethylamine in its amine salt. An example of an anionic group is dimethylol-propionic acid in its salt form. An example of non-ionic stabilizing group is a hydroxyl functional polyethyleneoxide chain. In the case of anionically stabilizing groups the acid function can be neutralized with a base which can be metal (such as potassium) or a tertiary amine. In case of cationically stabilized disperisons, the amine group can be stabilized with a mono acid (e.g., acetic acid). The polyester prepolymer can also be formed using chain extension of a lactone on a diol (e.g., capa linear polycaprolactones available from Interox). Linear polyethers are available from many companies and are based on, e.g., ethylene-, propylene- and or butyleneoxide. The prepolymer might also contain ether difunctional polymers such as hydroxy fifunctional acrylics, polycarbonates or polyubtadienes.

The urethane prepolymer is formed at 100% active ingredients or in an inert solvent. An inert solvent means a chemical compound which does not have an active hydrogen atom according to the Zerewitinoff test, J. Amer. Chem. Soc. 49, 3181 (1927).

The molecular weight of the various difunctional reaction partners can vary between 200 and 6000. The temperature of forming the prepolymer can vary up to 160° C. but typically is run to avoid side reactions of the diisocyanate at 60°–100° C. Suitable catalysts such as amines or metal salts can be used to accelerate the reaction. The end point is typically determined by running the NCO content.

Chain extending the amine functional dispersion or emulsion with the isocyanate or polyurethane prepolymer can be done at any temperatures below reflux of the water/solvent blend. The ratio of equivalent isocyanate in the prepolymer to equivalent amine in the dispersion-/emulsion can also vary between 1/5 and 5/1 and is mainly determined by getting sufficient cross reaction to make both polymers fully compatible. Additional additives can be used in the chain extension step. Part or a whole of the isocyanate groups might also be blocked with labile blocking agents such as methylethyl ketoxime or caprolactam.

The polymers are typically used for further crosslinking in case they still have functional groups. Crosslinkers can be water soluble or dispersible melamine, urea or benzoguanamine resins.

EXAMPLES

In the following examples, parts, proportions and percentages are by weight (such as in grams) except where indicated otherwise. Instead of butanol, other solvents such as xylene can be used and later stripped off after dispersing into water.

EXAMPLE 1

Polyacrylic-amine Functional Dispersion

The following ingredients were fed from feed tanks into a reactor equipped with a stirrer and a condenser and temperature control unit.

| | |
|---|---|
| n-Butanol (B) | 600 |
| Heat at reflux - 120° C. in reactor | |
| Styrene (S) | 600 |
| Methylmethacrylate (MMA) | 600 |
| Butylacrylate (BA) | 1200 |
| Hydroxyethylacrylate (HEA) | 360 |
| Acrylic acid (AA) | 240 |
| Tert-butylperoxy-2-ethylhexanoate 60 (Trigonox 21S from Akzo) (tBPEH) | |
| B | 60 |
| Feed over 3 hours at reflux | |
| B | 40 |
| Rinsing step for feed tank - Add to reactor - Hold 15 minutes | |
| tBPEH | 4 |
| add to reactor from feed tank | |
| B | 16 |
| Rinsing - Hold 30 minutes at 120° C. reflux | |
| Repeat 4 times - additional 4 parts tBPEH for rinsing | |
| Cool to 70° C. - Test prepolymer | |

Test results on prepolymer diluted to 60% theoretical solids with B

| | |
|---|---|
| Solids | 60.4% |
| Visc. Gardner Holtz Z4 | |
| AN (Acid Number) | 58.7 |
| Continue the reaction by iminating the acid functional prepolymer to form an amine functional dispersion | |
| Propylene imine (PI) | 96 |
| Add to reactor | |
| B | 64 |
| Rinsing - Hold till AN = 30 by reaction at 70° C. | |
| Triethylamine (TEA) | 125.6 |
| Add neutralizer | |

| | |
|---|---|
| Deionized water (DW) | 6194.4 |
| Disperse | |
| Test results: | |
| Solids | 30% |
| pH | 9.5 |
| MN | 8800 |
| MW | 95,200 |
| AN after imination | 30.9 |
| Amine value | 27.8 |

EXAMPLE 2

Polyurethane Prepolymer

This example describes the formation of an isocyanate terminated polyester-urethane prepolymer.

| | |
|---|---|
| (based on neopentylglycol (NPG), hexanediol (HD), adipic acid (ADA) - MN = 546, OH # 205) | 606.9 |
| Dibutyltindilaurate catalyst (DBTDL) | 0.1 |
| Heat 70–75° C. under nitrogen purge in a reactor equipped with condensor, addition funnel and temperature control unit. | |
| Isophoronediisocyanate (IPDI) | 444 |
| Add slowly over 45 minutes | |
| NMP | 49 |
| Rinsing - Hold 3 hours at 95° C. | |

EXAMPLE 3

Polyurethane Modified Acrylic Dispersion

This example describes chain extension of the isocyanate terminated prepolymer of Example 2 with the amine functional acrylic dispersion of Example 1.

| | |
|---|---|
| Example 1 | 1580 |
| DW | 516 |
| Mix with high shear mixer | |
| Example 2 | 212.1 |
| Add over 30 minutes and stir till NCO in IR has disappeared | |
| Test results: | |
| solids | 29.3 |
| pH | 8.4 |
| MN | 5,500 |
| MW | 362,500 |

(Biomodal MW distribution - showing chain extension).

EXAMPLE 4

Polyacrylic-amine Functional Dispersion

Formula see Example 1 but instead of 96, PI, 64 PI was used

| Test results | |
|---|---|
| solids | 29.2 |
| pH | 8.2 |

EXAMPLE 5

A, B, D Urea Modified Acrylics

These examples describe chain extension of an amine functional acrylic dispersion with diisocyanate.

C

-continued

| | A | B | (control) | D |
|---|---|---|---|---|
| Example 4 | 255.3 | 255.3 | 255.3 | 255.3 |
| DW | 77.6 | 77.6 | 51.06 | 77.6 |
| Mix until homogeneous under high shear | | | | |
| IPDI | | 3.12 | | 6.24 |
| m-xylylenediisocyanate | 3.55 | | | |
| solids | 24.7 | 24.4 | 24.2 | 26.9 |
| pH | 8.6 | 8.4 | 8.6 | 8.4 |

Control had MN = 10,100
MW = 125,700

All other samples were insoluble (microgelled) in THF for GPC run, showing chain extension.

EXAMPLE 6

Polyacrylic-amine Functional Emulsion

This example describes formation of an amine functional acrylic emulsion.

| | |
|---|---|
| DW | 504 |
| Fenopon CO436 (F) from GAF | 29 |
| (ammonium salt of sulfated alkylphenol ethoxylate) | |
| Heat at 60° C. under N₂ purge in a reactor equipped with condensor, addition funnel and temperature control. | |
| Ammoniumpersulfate (AP) | 0.8 |
| DW | 19.2 |
| Add to reactor. Start next feed | |
| MMA | 160 |
| BA | 160 |
| Hydroxypropylmethacrylate (HPMA) | 60 |
| Clycidylmethacrylate (GMA) | 20 |
| Add 10%. Hold 20 minutes. Feed rest over 3 hours at 60° C. | |
| DW | 10 |
| Rinsing - Heat 90° C. | |
| Ammonia solution (25% in DW) | 9.5 |
| DW | |
| Add to reactor. Hold 45 minutes at 90° C. | |
| DW | 22 |
| Thin down | |
| Solids | 41.3% |
| pH | 10 |
| Total ammonia | 0.48% |
| Total ammonia bound to polymer | 0.15% |

Equipment and processes equal to previous examples was used to prepare examples 7–18.

EXAMPLE 7

Polyurethane Prepolymer

| | |
|---|---|
| Polyester based on butanediol-adipic acid 2000 MN and OH = 56 | 400.0 |
| Dimethylolpropionic acid (DMPA) | 53.6 |
| NMP | 156 |
| TEA | 38.4 |
| Heat till 80–85° C. till dissolved. Cool 55° C. under nitrogen purge. | |
| IPDI | 199.8 |
| Add over 20 minutes at 65° C. max reactor temperature | |
| NMP | 85.6 |
| Rinsing - hold for NCO % = 1.8%. | |

EXAMPLE 8

A, B, Polyurethane Modified Acrylic Emulsion

| | A | B |
|---|---|---|
| Example 6 | 1000 | 1000 |
| DW | 334.1 | 334.1 |
| Dimethylethanolamine | 5 | 5 |
| Antorox CO730 from GAF (Nonylphenolpolyethyleneoxide) | | 25 |
| Heat to 50° C. while stirring | | |
| Example 7 | 334.1 | 334.1 |
| Add over 20–30 minutes while stirring | | |
| Solids | 43.7 | 43.5 |
| pH | 6.5 | 6.6 |
| Control Test 1 - Polyurethane-urea Dispersion | | |
| DW | 933.4 | |
| High shear mixing | | |
| Example 7 | 933.4 | |
| Add slowly while dispersing | | |
| Ethylenediamine | 9.6 | |
| DW | 100 | |
| Add over 20' | | |
| DW | 68.4 | |
| Rinsing - Hold 1 hour | | |
| Solids | 33.2% | |
| pH | 6.8 | |

To prove the advantages of chain extending the polyurethane in presence of the amine functional acrylic emulsion following test was run:

| | |
|---|---|
| Control A: Blend of acrylic (amine functional) and polyurethane-urea. | |
| Example 6 | 100 |
| Example 9 | 77 |
| Control B: Chain extended acrylic (amine functional) with polyurethane. | |
| Example 8A | 100 |
| DW | 40 |

Both control A and B contain the same solids and ratio of acrylic/urethane. Control A resulted in a strong viscosity increase on blending while Control B was fluid and low in viscosity. A draw-down on glass was made of both A and B and baked 20 minutes at 120° C. Control A gave a slightly cloudy structured film with low hardness (80" Persoz) while B resulted in a smooth transparent hard film (209" Persoz). This show incompatability in Control A compared to Control B which represents the invention.

EXAMPLE 9

Polyacrylic-amine Functional Dispersion

This dispersion contains no cosolvent.

| | |
|---|---|
| Cardura E (Shell) | 294 |
| Dimethylmaleate | 147 |
| Heat at 170° C. | |
| Butylmethacrylate (BMA) | 196 |
| S | 147 |
| AA | 196 |
| Ditertiarybutylperoxide | 20 |
| Feed over 6 hours at 165–170° C. Hold 30 minutes. Cool to 120° C. | |
| Dimethylethanolamine (DMEA) | 119.4 |
| Add and cool to 105° C. | |
| DW | 2505.6 |
| Add over 30' and disperse. Heat 65–70° C. | |
| Propyleneimine | 13 |

-continued

| Add to reactor | |
|---|---|
| DW | 414 |
| Rinsing - add to reactor and hold 90' at 70-75° C. | |
| Solids | 24.7% |
| pH | 8 |
| MN | 3000 |
| MW | 13,400 |

EXAMPLE 10

Polyurethane-urea Modified Acrylic Dispersion

| Example 9 | 1200 |
|---|---|
| Mix under high shear | |
| Example 7 | 160.2 |
| Add slowly while dispersing. Mix 1 hour. | |
| Solids | 30.4 |
| pH | 7.6 |

EXAMPLE 11

Polyacrylic-amine Functional and Crosslinked (Microgel)

| DW | 504 |
|---|---|
| Disponil SUS87 from GAF (Sulfo succinic acid semi ester-disodium salt) | 29 |
| Heat to 60° C. under nitrogen purge. | |
| AP | 0.8 |
| DW | 19.2 |
| Add to reactor. Start next feed. | |
| MMA | 156 |
| BA | 120 |
| Polypropylene glycol monomethacrylate (Bisomer PPM5) from BP | 60 |
| GMA | 48 |
| Methacrylic acid MAA | 16 |
| Add 10%. Hold 20 minutes. Feed rest over 3 hours. | |
| DW | 10 |
| Rinsing - Heat 90° C. | |
| Ammonia solution (25% in DW) | 35 |
| Add to reactor | |
| DW | 2 |
| Rinsing - Hold 45 minutes at 90° C. | |
| Solids | 40.6% |
| pH | 10.2 |

EXAMPLE 12

Polyurethane Prepolymer

| Polyester based on neopentylglycol and adipic acid MN = 1028 OH = 110 | 1028 |
|---|---|
| DMPA | 93.8 |
| TEA | 35.35 |
| NMP | 130.60 |
| Heat at 100° C. till dissolved. Cool 80° C. under nitrogen purge | |
| IPDI | 599.4 |
| NMP | 15 |
| Add over 20 minutes - Temperature maximum 95° C. | |
| NMP | 16.5 |
| Rinsing - hold for NCO = 3.2 | |
| NMP | 106.3 |
| Thin down. | |

EXAMPLE 13

Polyurethane-urea Modified Acrylic Emulsion

| Example 11 | 1000 |
|---|---|
| DW | 29.7 |
| DMEA | 9 |
| Heat at 70° C. | |
| Example 13 | 497 |
| Add slowly while dispersing. Hold 90' | |
| Solids | 47% |
| pH | 7.1 |

EXAMPLE 14

Polyacrylic-hydrazide Functional Emulsion

| DW | 351.9 |
|---|---|
| Fenopon CO436 from GAF | 2.6 |
| Heat 81° C. under $N_2$ | |
| Fenopon CO436 | 3.7 |
| MMA | 136.9 |
| BA | 152.1 |
| Diacetoneacrylamide | 10 |
| DW | 258 |
| Preemulsifying monomer blend. Add 5% to reactor. | |
| AP | 1 |
| DW | 25.4 |
| Add to reactor. Hold 20 minutes. Feed rest of free emulsion over 60 minute at 85-86° C. | |
| DW | 13.8 |
| Rinsing | |
| Adipic dihydrazide | 5.2 |
| DW | 19.4 |
| Add - hold 60 minutes at 86-88° C. | |
| DW | 20 |
| Rinsing | |

EXAMPLE 15

Polyurethane Prepolymer

| Polyester based on butanediol and adipic acid MN2000 OH = 56 | 400 gm |
|---|---|
| DMPA | 53.6 |
| NMP | 156 |
| Heat 70° C. till dissolved under nitrogen purge | |
| IPDI | 199.8 |
| Add over 20-25 minutes | |
| NMP | 65.6 |
| Rinsing - hold till NCO = 1.1% | |
| TEA | 38.4 |
| Add - neutralize | |
| NMP | 20 |
| Rinsing | |

EXAMPLE 16

Polyurethane-urea Modified Acrylic Emulsion

| Example 14 | 1000 |
|---|---|
| DMEA | 5 |
| DW | 120 |
| Heat 50° C. | |
| Prepolymer Example 16 | 94 |
| Add slowly while dispersing. Hold 60 minutes. | |

EXAMPLE 17

Polyacrylic-amine Functional Emulsion

| | |
|---|---|
| DW | 504 |
| Fenopon CO436 | 2.4 |
| Heat 60° C. under $N_2$ | |
| AP | 0.8 |
| H508 | 19.2 |
| Add to reactor | |
| MMA | 176 |
| BA | 176 |
| HPMA | 40 |
| GMA | 8 |
| Feed 10% - hold 20 minutes - feed rest over 3 hours. | |
| DW | 10 |
| Rinsing - heat 90° C. | |
| Ethylenediamine | 2 |
| DW | 13 |
| Add to reactor - hold 60 minutes at 90° C. | |
| DW | 27 |
| Rinsing 1000 | |
| Test results: | |
| Solids | 40.9% |
| pH | 9.8 |

EXAMPLE 18

Polyurethane-urea Modified Acrylic Emulsion

| | |
|---|---|
| Example 17 | 1000 |
| DW | 140 |
| High shear mixing | |
| Example 7 | 140 |
| Add - stir for 1 hour | |
| DMEA | 6.3 |
| Add | |
| Test results: | |
| Solids | 39.6% |
| pH | 7.8. |

All polyurethane-urea modified acrylic emulsions or dispersions were stable.

I claim:

1. A method of preparing a stable aqueous dispersion of polyurethane-urea modified polyacrylic comprising
   a. preparing a reaction mixture in the form of an aqueous dispersion or emulsion of primary amine-functional or hydrazide-functional polyacrylic,
   b. adding to the reaction mixture an isocyanate terminated prepolymer or a diisocyanate, and
   c. reacting the resultant mixture to cause chain extension to form a polyurethane-urea modified polyacrylics.

2. The method of claim 1 wherein the ratio of polyurethane to polyacrylic is between 1/10 to 10/1.

3. The method of claim 1 wherein the polyurethane prepolymer is a reaction product of n moles of difunctional polyol with n+1 moles of a difunctional diisocyanate.

4. The method of claim 3 wherein the polyurethane prepolymer contains an effective amount to stabilize the prepolymer in water of anionic salt groups or cationic salt groups or water soluble groups selected from polyethyleneoxide and polypropylene oxide copolymer.

5. The method of claim 3 wherein the polyurethane is based partly on a hydroxyl functional polyester, polyether or polybutadiene with a molecular weight between 500 and 3000 and an OH value between 35 and 230.

6. The method of claim 3 where the diisocyanates are of the aliphatic or cycloaliphatic type.

7. The method of claim 1 where the polyacrylic is based on an acrylic vinyl copolymer.

8. The method of claim 7 wherein the polyacrylic dispersion has an acid value between 30 and 150 and an amine value between 10 and 150.

9. The method of claim 8 where the polyacrylic has a hydroxyl value between 0 and 200 and a molecular weight average between 3000 and 150,000.

10. The method of claim 8 wherein the amine functionality is obtained through partial imination of the acid groups.

11. The method of claim 1 wherein the polyacrylic emulsion is formed through emulsion polymerization of acrylic-vinyl monomer blend using anionic, cationic or non-ionic surfactants.

12. The method of claim 11 wherein the polyolefin emulsion has an acid value between 0 and 150 and an amine value between 10 and 150.

13. The method of claim 12 wherein the amine functionality is obtained through imination of the acid groups or through reaction of an epoxy group with ammonia, or a mono- di- or polyfunctional amine.

14. The method of claim 11 wherein the emulsion has a hydrazide functionality obtained through reaction of a mono- or dihydroxide with a ketone or aldehyde functional monomer.

15. The method of claim 12 wherein the emulsion has a hydroxy value between 0 and 200.

16. The method of claim 11 wherein the emulsion contains 0.5–5% di- or polyfunctional monomers or 0.5–20% of a reactive monomer blend during the process of making the emulsion so that the formed emulsion is partly or completely insoluble in methylethylketone.

17. The method of claim 1 where the extension is done with an aliphatic or cycloaliphatic diisocyanate.

* * * * *